United States Patent [19]

Glover

[11] 4,265,356

[45] May 5, 1981

[54] APPARATUS FOR COMBINING ARTICLES FROM PLURAL LANES INTO A SINGLE LANE

[75] Inventor: Charles G. Glover, Cincinnati, Ohio

[73] Assignee: The Lodge & Shipley Company, Cincinnati, Ohio

[21] Appl. No.: 68,076

[22] Filed: Aug. 20, 1979

[51] Int. Cl.³ .............................................. B65G 43/00
[52] U.S. Cl. .................................... 198/444; 198/452
[58] Field of Search ............... 198/443, 444, 448, 451, 198/452, 447, 442

[56] References Cited

U.S. PATENT DOCUMENTS

| | | | |
|---|---|---|---|
| 1,161,893 | 11/1915 | Schmedtje | 198/452 |
| 3,193,078 | 7/1965 | Amenta et al. | 198/442 X |
| 4,066,163 | 1/1978 | Rowekamp | 198/442 |

FOREIGN PATENT DOCUMENTS 2419213  11/1975  Fed. Rep. of Germany ........... 198/451

Primary Examiner—Robert B. Reeves
Assistant Examiner—Douglas D. Watts
Attorney, Agent, or Firm—Wood, Herron & Evans

[57] ABSTRACT

Combining apparatus wherein plural upstream conveyors feed articles into a single downstream conveyor lane. A swinging guide pivoted at its downstream end has an upstream end adapted to be moved from lane to lane at the discharge end of the plural conveyor lanes to receive articles from the conveyor lanes, one at a time, and feed them onto the single conveyor lane.

1 Claim, 5 Drawing Figures

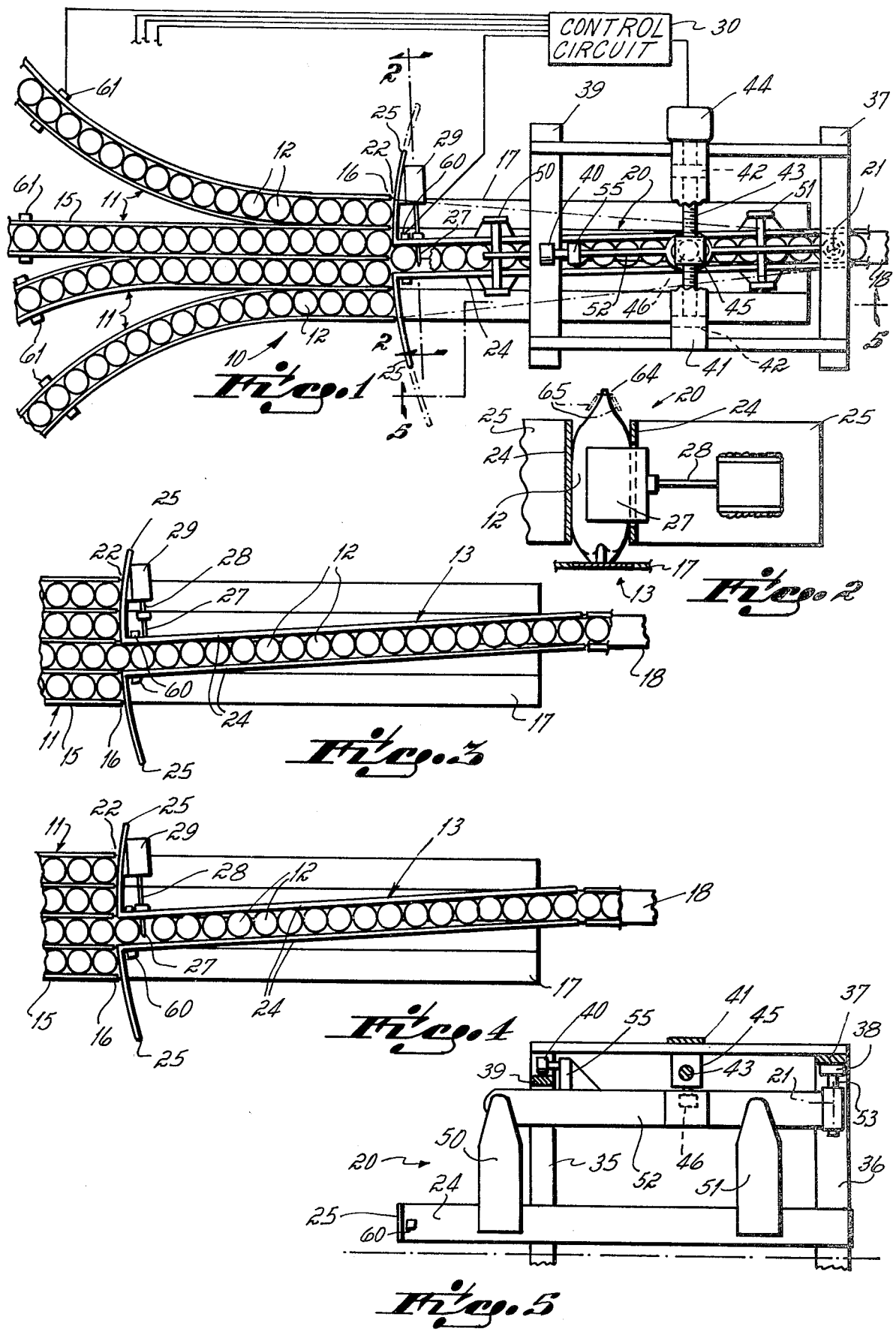

APPARATUS FOR COMBINING ARTICLES FROM PLURAL LANES INTO A SINGLE LANE

This invention relates to article handling apparatus, and more particularly, to apparatus for combining articles being fed from plural lanes onto a single conveyor lane. The invention will be described with particular reference to bottle handling, although it should be understood that the invention can be applied equally well to other types of articles.

In bottle handling, as in the beverage and beer industries, bottles are frequently moving on plural lanes and must be combined into a single lane for further processing. For example, bottles received from the manufacturer arrive in cases containing, for example, a 4±6 pattern. Uncasing apparatus deposits the bottles onto a conveyor which has four lanes. Those bottles must be combined from the four lanes into a single lane so that they can move through further processing apparatus such as filling apparatus.

Similarly, plastic bottles may be formed on plural machines and fed in plural lanes to a single labeler, for example. Those plastic bottles must be combined into a single lane before moving on for further processing.

One common type of apparatus used for combining bottles from plural lanes into a single lane involves mechanisms which first combine pairs of lanes into single lanes and thereafter combine a thus formed pair of single lanes into one single lane. This apparatus is somewhat complex and requires considerable conveyor length to effect the combining operation thereby using valuable plant floor space.

An objective of the present invention has been to provide combining apparatus wherein plural lanes, for example four, are combined directly, rather than by stages, into a single lane.

Another objective of the present invention has been to provide a combiner which is suitable for handline very unstable bottles such as the petaloid which is a plastic bottle having six feet at the bottom of the bottle formed by the molding process. The bottle is tall, light and compressible. These factors, coupled with the absence of a wide, flat bottom, make the bottle very unstable.

The objectives of the invention are attained by combiner apparatus which includes as a principal element an elongated swinging guide arm which is pivoted at its downstream end over the single lane conveyor and has an upstream end adjacent the discharge end of the plural incoming conveyors. A control mechanism is provided for periodically shifting the arm from lane to lane so that the arm receives bottles from one lane at a time and feeds them onto the single lane while blocking off the remaining of the incoming lanes.

Preferably, the bottles from an incoming lane will be fed only if there is a considerable prime or grouping of bottles in the incoming lanes since long groups fed in abutting relation result in a more efficient combining operation, and bottles in abutting relation tend to be mutually supporting so that unstable bottles will be less likely to fall over.

The several objectives and features of the invention will become more readily apparent from the following detailed description taken in conjunction with the accompanying drawings in which:

FIG. 1 is a diagrammatic top plan view of the apparatus of the present invention;

FIG. 2 is a cross-sectional view taken along lines 2—2 of FIG. 1;

FIGS. 3 and 4 are diagrammatic top plan views illustrating the sequence of operations; and FIG. 5 is a cross-sectional view taken along lines 5—5 of FIG. 1 illustrating the support for the guide arm.

The combining apparatus indicated at 10 combines bottles from plural lanes 11 into a single lane 13. Each upstream lane has guide rails 15 which are spaced apart approximately the width of the bottles to confine the bottles to single file order. The plural lanes 11 have discharge ends located at 16. Endless belt conveyors 17 carry the bottles 12 past the discharge ends 16 of the guide rails 15. One of the endless conveyors 17 is extended as at 18 to form the single lane onto which the plural lanes are to be combined.

A guide arm 20 is pivoted at 21 downstream of the discharge ends 16 and has an upstream end 22 which is swingable in a horizontal plane past the discharge ends 16 of the guide lanes 11. The guide arm 20 is channel-shaped, that is, it has two spaced rails 24 forming a channel which is wide enough to permit a single file of bottles to pass. At the upstream end of the guide arm 20, the rails 24 terminate the arcuate wings 25 which sweep adjacent the discharge ends 16 of the guide lanes 11 and block the flow of bottles from a selected one of the guide lanes 11.

An arresting arm 27 is carried on the rod 28 of a piston slidable in a cyliner 29 which is mounted on one of the rails 24. The cylinder is double-acting and is controlled through valves (not shown) operating through a control circuit 30. The piston and cylinder thrust the arresting arm into and out of the path of bottles moving into the channel-shaped guide arm 20. The restraining arm is spaced downstream of the entrance end of the guide arm by an amount equal to a bottle diameter.

The guide arm is mounted on a support structure having upstream posts 35 and downstream posts 36. The posts carry rearward transverse member 37 having a bearing 38 to which the guide arm 20 is pivotally mounted to swing about axis 21. An upstream transverse support member 39 supports a roller 40 which is carried by the guide arm 20. The roller rolls along the transverse member 39 to support the upstream end of the guide arm. Intermediate the upstream and downstream transverse support members is a transverse member 41 which carries bearing blocks 42 at each end in which a screw 43 is rotatably mounted. One end of the screw 43 is drivably connected to a stepping motor 44 mounted on the transverse member 41. A nut 45 is mounted on the screw and has a depending roller 46 engageable with the swinging arm to move the swinging arm in a horizontal plane about the pivot axis 21 when the stepping motor is energized. The control circuit 30 is programmed to apply to the stepping motor 44 a sufficient number of pulses to move the stepping motor from one lane to another.

The guide arm is formed by the elongated guide rails 24 which are supported at their forward and rearward ends by vertical straps 50, 51, the upper ends of the straps being fixed to an elongated bar 52. The downstream end of the bar 52 supports a vertical shaft 53 which is pivoted about axis 21 in the bearing block 38. The upstream end of the bar 52 carries a bracket 55 to which the roller 40 is mounted.

The rails 24 carry an electric eye 60 which is used to count the bottles passing into the guide arm 20. Each incoming lane 11 also carries an electric eye 61 which detects the presence of a prime of at least a predetermined number of bottles ready for transfer into the guide arm 20. In the illustrated form of the invention, a prime of 15 is required before the guide arm will stop at a position to receive bottles from a particular lane. Further, when the apparatus is used in a situation in which the four lanes are being fed from four bottle-forming machines, in the event that one of the bottle-forming machines is down, the apparatus will continue to operate with the guide arm picking up bottles only from the lanes being fed by operative bottle-forming machines.

The electric eyes 60 and 61, as well as the stepping motor 44, are connected to the control circuit 30. The control circuit 30 preferably has means for determining the number of bottles which must pass through the guide arm before a shift is made to another lane. The control circuit also has means for positioning the guide arm only at lanes having a sufficient prime to feed the desired number of bottles.

Where the bottles are very unstable, as, for example, the petaloid bottles, it may be desired to provide the bottle with a horizontal ring 64 (FIG. 2) at the upper portion of its neck. The apparatus should then include guide rails 65 through which the bottles pass, the guide rails being located just under the ring 64 so as to prevent the bottles from falling over. Alternatively, every effort should be made to keep a substantial number of bottles grouped together so that the bottles are self-supporting and so that the stopping of the leading bottle of the group does not send a pulse, through a chain reaction, to the trailing bottle and cause the trailing bottle to fall over.

In operation, bottles from whatever source are fed to the combiner through the upstream lanes 11. Bottles are fed through only one of the lanes at a time into the guide arm 20 as shown, for example, in FIG. 3. When the control circuit determines that sufficient bottles have passed through the guide arm from a particular lane, the restraining arm 27 is thrust across the rails 24 to block further passage of bottles (see FIG. 4). The guide arm 30 is then swung to a new lane (FIG. 1) with the wings 25 and the single captured bottle 12 preventing flow of bottles from any of the lanes into the guide arm 20. When the guide arm comes to rest at the desired lane, the restraining arm 27 is withdrawn and bottles then flow from the new lane into the guide arm 20 and on for further processing.

The guide arm 20 will preferably swing back and forth stopping at each lane unless the control circuit indicates a lane has insufficient prime. That lane will be passed over and the arm will stop at the next adjacent lane.

I claim:

1. Combining apparatus comprising, plural conveyor lanes moving in a first direction, means associated with each of said plural conveyor lanes for determining presence of a preselected number of bottles in each of said plural lanes, a single conveyor lane moving in said first direction and having an upstream end located downstream of the downstream end of said plural conveyor lanes, a pivotal guide having a downstream end pivoted adjacent said single conveyor lane, and an upstream end swingable to positions adjacent any of said plural lanes, means for counting the bottles passing through said pivotal guide, and means for selectively swinging said pivotal guide to each of said positions after a preselected number of bottles has passed into said guide, said pivotal guide being shifted only to a position wherein a preselected number of bottles has been determined to be present in the lane associated with that position.

* * * * *